US008312100B2

(12) United States Patent
Coyle et al.

(10) Patent No.: US 8,312,100 B2
(45) Date of Patent: Nov. 13, 2012

(54) MANAGING ORPHANED REQUESTS IN A MULTI-SERVER ENVIRONMENT

(75) Inventors: R. Scott Coyle, Endicott, NY (US);
Steven Shultz, Endicott, NY (US);
Hongjie Yang, Binghamton, NY (US)

(73) Assignee: International Business Machines Corporation, Armonk, NY (US)

( * ) Notice: Subject to any disclaimer, the term of this patent is extended or adjusted under 35 U.S.C. 154(b) by 718 days.

(21) Appl. No.: 12/414,809

(22) Filed: Mar. 31, 2009

(65) Prior Publication Data
US 2010/0251237 A1    Sep. 30, 2010

(51) Int. Cl.
*G06F 15/16*    (2006.01)
(52) U.S. Cl. ................. 709/213; 709/218; 709/219
(58) Field of Classification Search .......... 709/213, 709/218–219
See application file for complete search history.

(56) References Cited

U.S. PATENT DOCUMENTS

| | | | | |
|---|---|---|---|---|
| 5,692,193 | A * | 11/1997 | Jagannathan et al. | 718/106 |
| 6,023,722 | A * | 2/2000 | Colyer | 709/201 |
| 6,105,147 | A * | 8/2000 | Molloy | 714/16 |
| 6,301,627 | B1 * | 10/2001 | Neal et al. | 710/40 |
| 6,487,643 | B1 * | 11/2002 | Khare et al. | 711/150 |
| 6,748,554 | B2 * | 6/2004 | Jin et al. | 714/15 |
| 7,516,176 | B2 * | 4/2009 | Potter et al. | 709/201 |
| 7,581,006 | B1 * | 8/2009 | Lara et al. | 709/226 |
| 7,730,489 | B1 * | 6/2010 | Duvur et al. | 718/104 |
| 7,870,426 | B2 * | 1/2011 | Bretschneider et al. | 714/16 |
| 8,005,979 | B2 * | 8/2011 | Dinker et al. | 709/238 |
| 2005/0050385 | A1 * | 3/2005 | Chen | 714/11 |
| 2005/0125557 | A1 * | 6/2005 | Vasudevan et al. | 709/239 |
| 2008/0104442 | A1 * | 5/2008 | Diao et al. | 714/3 |
| 2009/0164571 | A1 * | 6/2009 | Potter et al. | 709/203 |

OTHER PUBLICATIONS

Heine Kolltveit and Svein-Olaf Hvasshovd, Preventing Orphan Requests by Integrating Replication and Transactions.*
Stefan Pleisch and Armas Kupsys and Andre Schiper, Preventing Orphan Requests in the Context of Replicated Invocation.*
Information Sciences Institute, Univeristy of Southern California for Defense Advanced Research Projects Agency.*

\* cited by examiner

*Primary Examiner* — Duyen Doan
(74) *Attorney, Agent, or Firm* — Dennis Jung, Esq.; Kevin P. Radigan, Esq.; Heslin Rothenberg Farley & Mesiti P.C.

(57) ABSTRACT

A request server automatically detects, in response to initialization of the request server, if there are previous generations of requests outstanding for the request server, and if so, immunizes itself against those requests. The request server starts one or more threads that are designed to gather messages associated with requests from previous incarnations of the server and handles those messages without affecting the requestors. While the request server is immunized from earlier generations of requests, the request server is capable of processing new requests.

19 Claims, 5 Drawing Sheets

US 8,312,100 B2

MANAGING ORPHANED REQUESTS IN A MULTI-SERVER ENVIRONMENT

TECHNICAL FIELD

This invention relates, in general, to processing within a multi-server environment, and in particular, to managing orphaned requests in the multi-server environment.

BACKGROUND OF THE INVENTION

In a typical multi-server environment, there are a plurality of request servers that receive work requests from requestors, such as client computers, and place those requests on a common queue. Then, a plurality of worker servers take the work requests off the queue, process the requests and return responses to the queue. Thereafter, the request servers that initially received the requests take their respective responses from the queue and return the responses to the original requestors.

If a request server fails and there are still pending requests for the request server, then a message is sent to the one or more requestors of those pending requests indicating that the requests are aborted. However, the worker servers may continue to process the requests and return responses to the queue. Then, if the request server restarts, either the request server will mistake old responses for new responses, and thus, give incorrect responses to new requests, or old responses will be left indefinitely on the queue, eventually clogging the queue.

SUMMARY OF THE INVENTION

Based on the foregoing, a need exists for a capability to more efficiently manage orphaned requests. In particular, a need exists for a capability that automatically detects that there are orphaned requests for a particular request server and handles those requests without affecting the requestors, and while allowing the request server to continue processing new requests.

The shortcomings of the prior art are overcome and additional advantages are provided through the provision of a computer program product for managing orphaned requests in a multi-server processing environment. The computer program product includes a storage medium readable by a processing circuit and storing instructions for execution by the processing circuit for performing a method. The method includes, for instance, automatically determining, by a request server executing on a processor of the multi-server processing environment, in response to recovery of the request server in which the request server is to process a new generation of one or more requests, whether there are one or more previous generations of requests of the request server that are outstanding; and immunizing, in response to the automatically determining indicating there are one or more previous generations of requests, the request server from the one or more generations of requests, wherein the immunizing includes selecting, by the request server, one or more messages associated with one or more requests from the one or more previous generations of requests; and processing the one or more messages, the processing including deleting one or more messages or saving one or more messages; wherein concurrent to the immunizing one or more requests of the new generation of one or more requests are capable of being processed by the request server.

Methods and systems relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION OF THE INVENTION

In accordance with an aspect of the present invention, in response to initialization of a request server, either for the first time or in recovery, the request server automatically detects if there are previous generations of requests outstanding for the request server, and if so, immunizes itself against those requests. That is, the request server protects itself from the harmful effects of previous generations of requests. As one example, the request server starts one or more threads that are designed to gather messages associated with requests from previous incarnations of the server and processes those messages without the requestors knowing of the processing and without affecting the requestors. The messages associated with the requests include requests and/or responses to the requests, and the processing includes, for instance, disposing of those requests and/or responses, or saving the responses for some time period for potential recovery, as desired or appropriate. No matter how long the in-process messages take, the immunization lasts until all requests of a given generation are processed. If the server goes down again, this new generation is immunized, along with any other previous generations that have not been completely disposed of. This processing is performed without any conventional logging. Further, while this request server is immunized, it continues processing new requests, as usual.

Figure 1A:
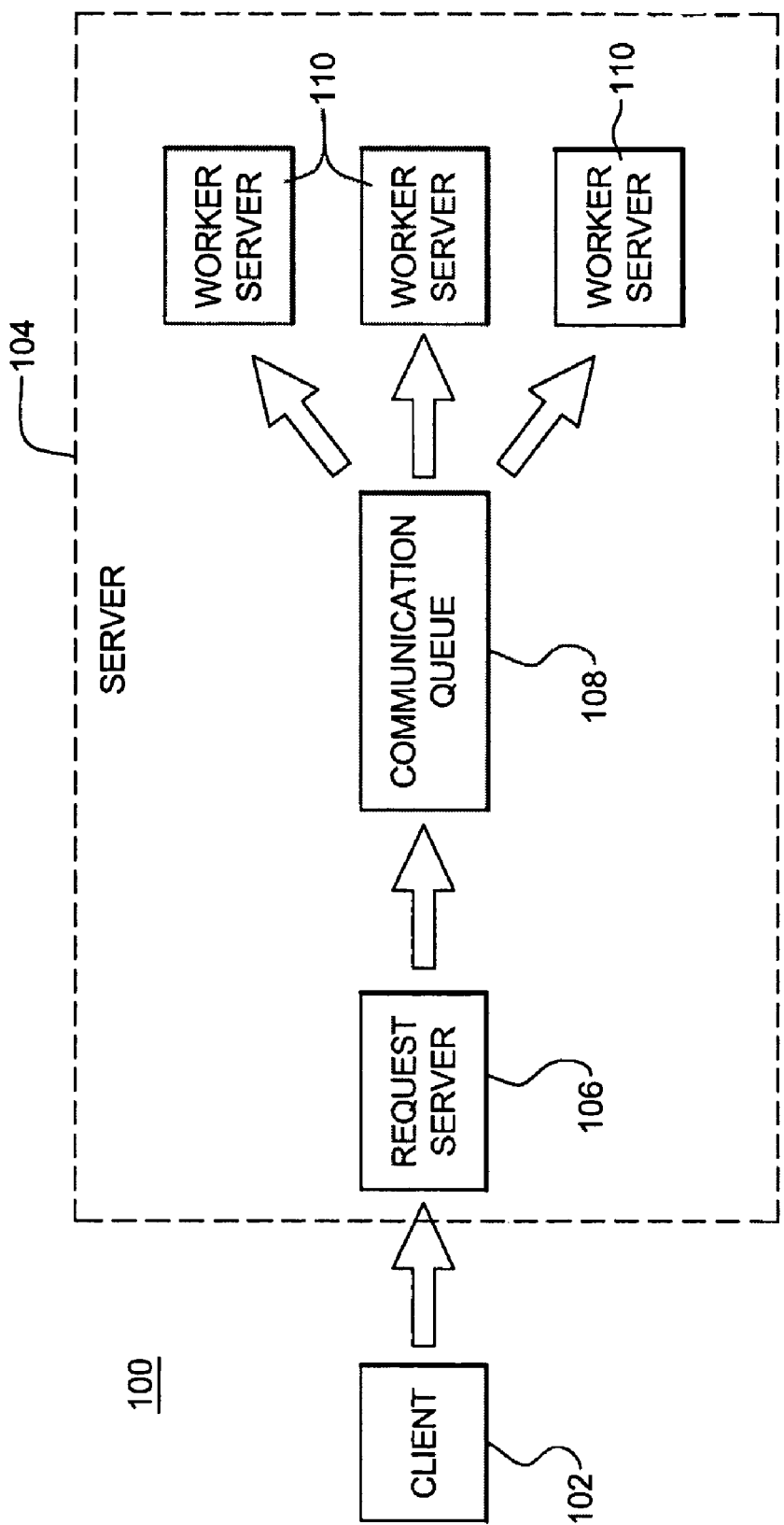
FIG. 1A depicts one embodiment of a multi-server processing environment incorporating and using one or more aspects of the present invention.

One embodiment of a multi-server processing environment 100 to incorporate and use one or more aspects of the present invention is described with reference to FIG. 1A. In one example, multi-server processing environment 100 includes at least one client 102 coupled to at least one server 104 via, for instance, a local area network, a wide area network or any type of global network, such as the internet, or any other computer network. In one example, client 102 and server 104 are executing on different physical machines. As examples, client 102 is a laptop computer or personal computer, and server 104 is a zSeries® machine based on the z/Architecture® offered by International Business Machines Corporation, Armonk, N.Y. The z/Architecture® is described in a publication entitled "z/Architecture—Principles of Operation," IBM® Publication No. SA22-7832-06, 7th Edition, February 2008, which is hereby incorporated herein by reference in its entirety. In one example, server 104 is an eServer zSeries® machine, offered by International Business Machines Corporation, Armonk, N.Y. z/Architecture®, IBM® and zSeries® are registered trademarks of International Business Machines Corporation, Armonk, N.Y., U.S.A. Other names used herein may be registered trademarks, trademarks or product names of International Business Machines Corporation or other companies.

In other examples, the client and/or server may be other types of computers or processors. Yet further, in another example, the client and server are executing on the same machine, such as the same zSeries® machine.

Server 104 includes, for instance, a request server 106 that receives requests from a requestor, such as client 102, and places those requests in a communication queue 108. Communication queue 108 is coupled to a plurality of worker servers 110, which take requests off the queue, process the requests, and then place responses to the requests back on the queue. Subsequently, the request server takes the responses off the queue and sends the responses to the originating requestor (e.g., client 102). Although one request server and three worker servers are depicted in FIG. 1A, there may be many more request servers and/or worker servers. Further, there may be more than one client or requestor. The numbers of clients and servers shown in FIG. 1A are illustrative only.

Figure 1B:
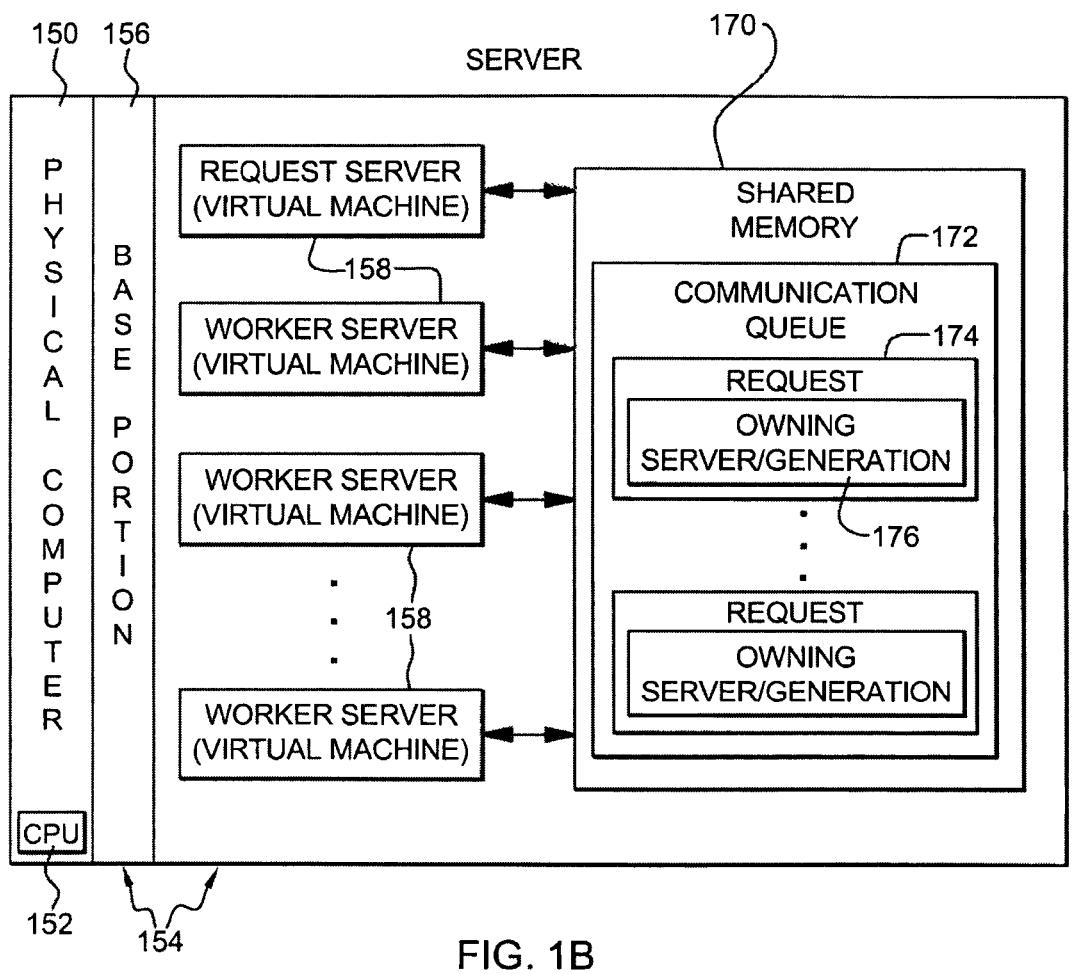
FIG. 1B depict further details of a server of FIG. 1A, in accordance with an aspect of the present invention.

Further details regarding one example of server 104 are described with reference to FIG. 1B. Server 104 includes a physical computer 150, such as a zSeries® machine, which includes, for instance, a central processing unit 152 and a virtual machine operating system or hypervisor 154 executing within the physical computer. By way of example, the virtual machine operating system is an IBM® z/VM® version 4.4.0, the details of which are disclosed in an IBM® Publication "z/VM 4.4.0—General Information," Publication No. GC24-5991-05, which is available from International Business Machines Corporation, Armonk, N.Y., or on the web, and is hereby incorporated herein by reference in its entirety.

Virtual machine operating system 154 includes a common base portion 156 (called "CP" in the z/VM® operating system) and a plurality of virtual machines (or virtual servers) 158. During installation of the virtual machine operating system, the system administrator defines one or more virtual machines 158. These virtual machines include one or more request servers, as well as one or more worker servers, which perform the work requested by the request servers. The virtual machines are coupled to a shared memory 170 (e.g., within physical computer 150), which includes, for instance, a communication queue 172. The communication queue is a communication mechanism used between the request servers and the worker servers. When a request server receives a request 174 from a requestor, it places the request on the communication queue. A worker server then pulls the request off the communication queue, processes the request, and places a response back on the communication queue. Thereafter, the request server extracts the response off the communication queue, and provides the response back to the requestor.

In accordance with an aspect of the present invention, prior to placing request 174 on the communication queue, it is modified by the request server by adding a tag 176 to the request. Tag 176 indicates, for instance, the request server that owns the request and the generation of the request server. There are many possibilities for indicating the generation of the request server, including, for instance, the last date of outage of the request server, a numerical number that indicates how many times this request server has been initialized, or a number indicating the start date/time of the request server, etc. When a worker server retrieves the request, it leaves behind a copy of the tag, so that the request server can determine if a worker server has one of its requests.

Figure 2:
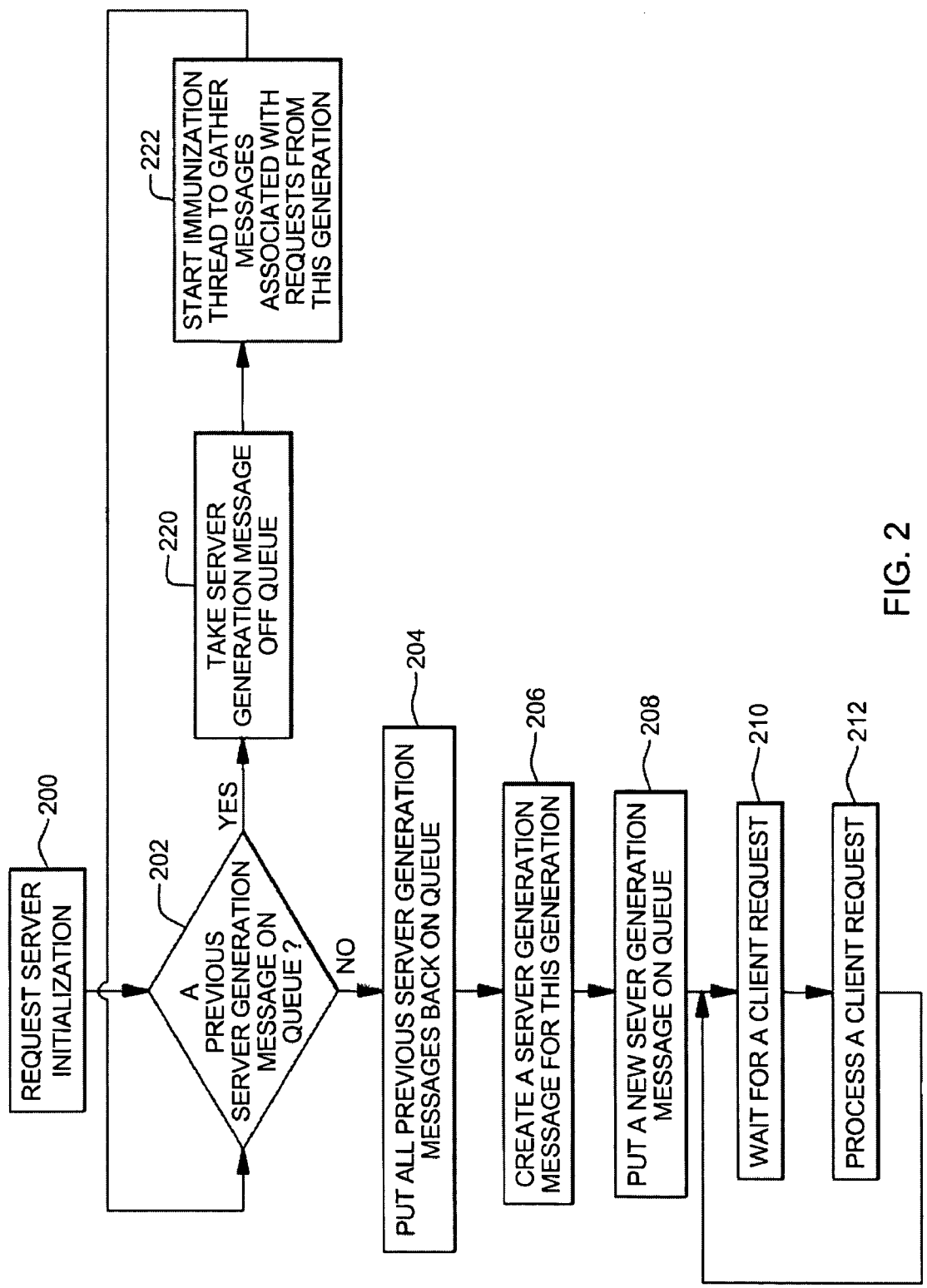
FIG. 2 depicts one embodiment of the logic associated with a request server of the server of FIG. 1B processing requests and initializing processing to handle orphaned requests, in accordance with an aspect of the present invention.

When a request server is initialized, either for the first time or thereafter, it automatically checks if there are previous generations of outstanding requests and immunizes itself against those requests. For example, it starts one or more immunization threads that are designed to gather messages associated with previous incarnations of the request server and handle those messages, as appropriate. This processing, which is performed by the request server, is described in further detail with reference to FIGS. 2 and 3.

In one example, in response to initialization of a request server, STEP 200, a determination is made as to whether a previous server generation message is on the communication queue for this request server, INQUIRY 202. That is, a determination is made as to whether a message exists on the queue indicating there was a previous generation of the request server, and thus, there may be outstanding requests/responses for the request server.

Assuming this is the first initialization of the request server, and therefore, there is no previous server generation message on the queue, processing proceeds with STEP 204. In particular, any previous server generation messages which were taken off the queue for processing, in which in this case there are none, are placed back on the communication queue, as described in further detail below, STEP 204. Further, a server generation message is created for this generation of the request server, STEP 206. In one example, the server generation message includes a key indicating it is a server generation message, the userid of the request server, and a unique value that can distinguish this generation from others (e.g., the time this message is generated). The new server generation message is placed on the communication queue, STEP 208. Thereafter, the request server waits for client requests, STEP 210. When a client request is received, it processes the client request, STEP 212. Processing then continues with waiting for client requests, STEP 210. This processing continues until the request server ends.

Returning to INQUIRY 202, if there is a previous server generation message on the queue for this request server indicating that this request server has been re-initialized and there may be outstanding requests for an earlier generation of the request server, then a server generation message for this request server is taken off the communication queue, STEP 220. In response thereto, at least one immunization thread is started to gather messages (e.g., requests and/or responses) associated with requests for this generation, STEP 222. This is described in further detail below with reference to FIG. 3. Subsequent to starting the immunization thread, processing returns to INQUIRY 202 to determine if there are other server generation messages on the queue for this request server.

If there are additional previous server generation messages on the queue for this request server, then another generation message is taken off the queue, STEP 220, and an immunization thread is started, STEP 222, as described above. However, if there are no more previous server generation messages on the queue for this request server, INQUIRY 202, then processing continues with putting the previous server generation messages that were taken off the queue in STEP 220 back on the queue, STEP 204, and creating a server generation message for this generation of request server, as described above.

Figure 3:
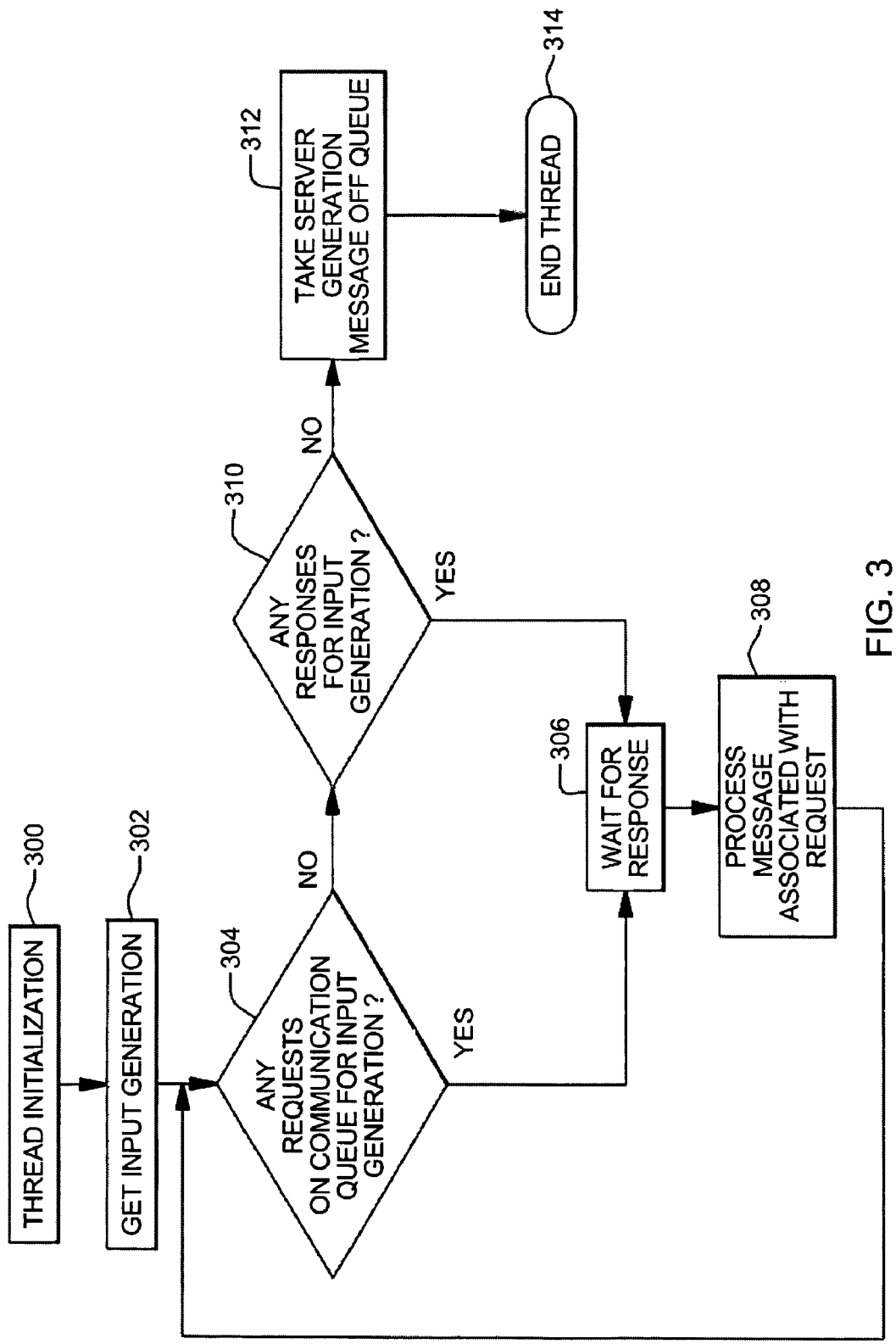
FIG. 3 depicts one embodiment of the logic associated with the request server immunizing itself from orphaned requests, in accordance with an aspect of the present invention.

Further details relating to immunizing the request server from orphaned requests are described with reference to FIG. 3. Initially, an immunization thread is started, STEP 300, and the generation for which the request server is to be immunized against is provided, STEP 302. Thereafter, a determination is made as to whether there are any requests on the communication queue for the generation indicated in STEP 302, referred to herein as the input generation, INQUIRY 304. This is determined via the tags in the communication queue. If there is a request on the communication queue for the input generation, then, in this example, the request server waits for a response to that request, STEP 306. When the response arrives, the message associated with the request is processed, STEP 308. As examples, this includes deleting the request and/or the response or saving the response for a defined time for potential recovery. In a further embodiment, the request can be deleted prior to receiving the response. Thereafter, processing continues with INQUIRY 304 to determine if there are any more requests on the queue for this generation. If so, processing continues with STEP 306, as described above.

If there are no requests on the communication queue for the input generation, then a further determination is made as to whether there are any responses on the communication queue for the input generation, INQUIRY 310. As an example, this determination is made via the tags, which are also included with the responses. If there are responses, then processing continues with wait for response, STEP 306, which should be immediate. That is, since the response is indicated as being on the communication queue, the request server takes the response and processes that response, which includes, for instance, removing the response from the queue and/or saving the response for a defined time, STEP 308. Thereafter, processing continues with INQUIRY 304.

Returning to INQUIRY 310, if there are no requests or responses on the communication queue for the input generation, the server generation message corresponding to this generation is removed from the communication queue, STEP 312. The thread processing is then complete, STEP 314.

Described in detail above is an efficient technique for immunizing request servers from orphaned requests in a multi-server processing environment, while enabling the request server to continue processing new requests and without confusing requestors.

One or more aspects of the present invention can be included in a computer program product to facilitate one or more aspects of the present invention. The computer program product includes a storage medium readable by a processing circuit and storing instructions for execution by the processing circuit for performing one or more of the capabilities of the present invention.

In one example, an article of manufacture (e.g., one or more computer program products) having, for instance, computer readable media includes one or more aspects of the present invention. The media has therein, for instance, computer readable program code means or logic (e.g., instructions, code, commands, etc.) to provide and facilitate the capabilities of the present invention. The article of manufacture can be included as a part of a computer system or sold separately.

Figure 4:
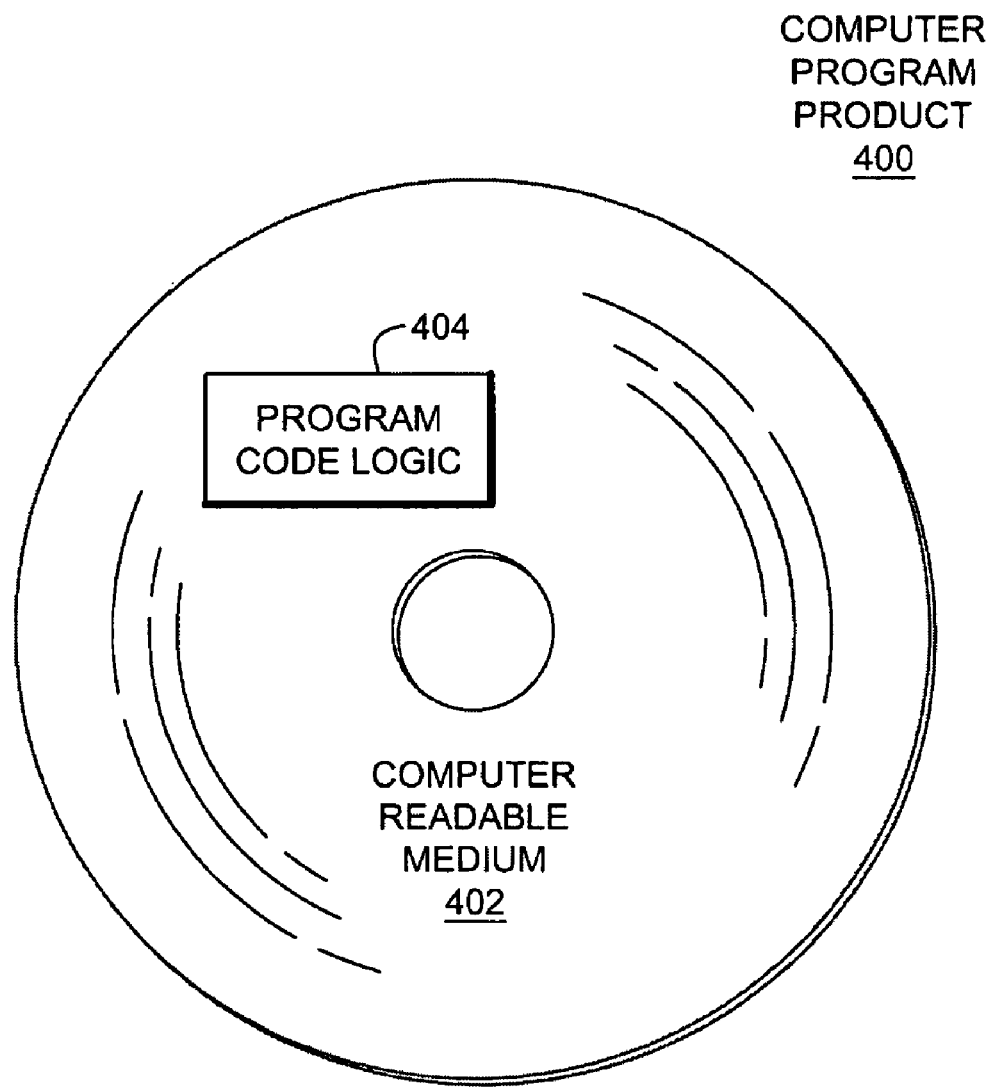
FIG. 4 depicts one embodiment of a computer program product incorporating one or more aspects of the present invention.

One example of an article of manufacture or a computer program product incorporating one or more aspects of the present invention is described with reference to FIG. 4. A computer program product 400 includes, for instance, one or more computer readable media 402 to store computer readable program code means or logic 404 thereon to provide and facilitate one or more aspects of the present invention. The medium can be an electronic, magnetic, optical, electromagnetic, infrared, or semiconductor system (or apparatus or device), as examples. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Moreover, one or more aspects of the present invention can be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider can receive payment from the customer under a subscription and/or fee agreement, as examples. Additionally or alternatively, the service provider can receive payment from the sale of advertising content to one or more third parties.

In one aspect of the present invention, an application can be deployed for performing one or more aspects of the present invention. As one example, the deploying of an application comprises providing computer infrastructure operable to perform one or more aspects of the present invention.

As a further aspect of the present invention, a computing infrastructure can be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Advantageously, request servers are immunized from orphaned requests of the request servers without requiring conventional logging and while the request servers continue processing new requests. This technique is particularly useful in those situations in which it takes little time (e.g., low single digits of seconds) to recover the request servers and worker servers.

Advantageously, each time a request server receives a request, it attaches a message including the request server id and the current generation. The current generation can be, for example, the last date of outage of the request server. If the request server fails again, a message is sent to the clients or original requestors indicating that their pending requests have been aborted. When the request server restarts, it checks the queue for both requests and responses which identify the request server and the previous generations, and processes them (e.g., deletes, saves for future recovery) without knowledge of the requestors. Thus, incorrect responses are not sent to requestors and/or old responses are not left on the queue.

In one example, the request servers are virtual servers executing within a multi-server processing environment. Further details regarding virtual servers are described in U.S. Pat. No. 7,299,468, entitled "Management of Virtual Machines to Utilize Shared Resources," Casey et al., issued Nov. 20, 2007; and U.S. Pat. No. 7,490,324, entitled "System and Method for Transferring Data Between Virtual Machines or Other Computer Entities," Shultz et al., issued Feb. 10, 2009, each of which is hereby incorporated herein by reference in its entirety.

Although various embodiments are described above, these are only examples. For example, the generation messages, tags and/or generation indicators can be other than described herein. As examples, they can include more, less or different information. Further, the immunizing processing can be performed by entities other than threads. Moreover, servers may be based on architectures other than the z/Architecture®. Yet further, there may be more or fewer clients and/or servers than described herein, and/or there may be other types of clients and/or servers.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer program product for managing orphaned requests in a multi-server processing environment, the computer program product comprising:
   a non-transitory storage medium readable by a processing circuit and storing instructions for execution by the processing circuit for performing a method comprising:
      automatically determining, by a request server executing on a processor of the multi-server processing environment, in response to recovery of the request server in which the request server is to process a new generation of one or more requests, whether there are one or more previous generations of requests of the request server that are outstanding, wherein the automatically determining is independent of use of the a log, and includes checking a communication queue coupled to the request server for one or more generation messages indicating one or more previous generations of the request server, wherein a generation message of the one or more generation messages comprises a key indicating it is a generation message, an identification of the request server, and a unique generation value distinguishing the generation of that generation message from the one or more previous generations; and
      immunizing by the request server, in response to the automatically determining indicating there are one or more previous generations of requests, the request server from the one or more generations of requests, wherein the immunizing comprises:
         selecting, by the request server, one or more messages associated with one or more requests from the one or more previous generations of requests; and
         processing the one or more messages, the processing including deleting one or more messages or saving one or more messages;
      wherein, concurrent to the immunizing, one or more requests of the new generation of one or more requests are capable of being processed by the request server.

2. The computer program product of claim 1, wherein the request server is a virtual server coupled to a plurality of other virtual servers, the plurality of other virtual servers performing the work of a request on behalf of the request server.

3. The computer program product of claim 1, wherein the immunizing comprises starting one or more immunization threads, in response to the checking indicating one or more previous generations of the request server, wherein the one or more immunization threads select the one or more messages associated with the one or more requests from the one or more previous generations of requests and perform the processing of the one or more messages.

4. The computer program product of claim 1, wherein the selecting one or more messages associated with one or more requests from the one or more previous generations comprises:
   indicating a previous generation of requests for the request server to be processed;
   determining if there are one or more requests of the indicated previous generation to be processed; and
   obtaining from a communication queue coupled to the request server one or more requests having the indicated previous generation, in response to the determining indicating there are requests to be processed.

5. The computer program product of claim 4, wherein each request of the communication queue includes a tag indicating its associated request server and a generation of the request server, and wherein the obtaining uses the tag to identify the one or more requests having the indicated previous generation.

6. The computer program product of claim 4, wherein the selecting one or more messages associated with one or more requests further comprises:
   determining if there are one or more responses for the indicated previous generation of the request server; and
   obtaining from the communication queue one or more responses having the indicated previous generation, in response to the determining indicating there are responses to be processed.

7. The computer program product of claim 6, wherein processing the one or more messages includes at least one of deleting the one or more requests, deleting the one or more responses, or saving the one or more responses.

8. The computer program product of claim 6, wherein the method further comprises deleting a generation message for the request server from the communication queue, in response to processing the one or more messages for a previous generation corresponding to the generation message.

9. The computer program product of claim 1, wherein the method further comprises receiving requests from one or more requestors, and wherein in response to the immunizing, the one or more requestors having requests for which the request server is immunized are unaware of the processing of the immunized requests.

10. A computer system for managing orphaned requests in a multi-server processing environment, the computer system comprising:
    a memory; and
    a processor in communications with the memory, wherein the computer system is capable of performing a method comprising:
      automatically determining, by a request server executing on a processor of the multi-server processing environment, in response to recovery of the request server in which the request server is to process a new generation of one or more requests, whether there are one or more previous generations of requests of the request server that are, wherein the automatically determining is independent of use of the a log and includes checking a communication queue coupled to the request server for one or more generation messages indicating one or more previous generations of the request server, wherein a generation message of the one or more generation messages comprises a key indicating it is a generation message, an identification of the request server, and a unique generation value distinguishing the generation of that generation message from the one or more previous generations; and
      immunizing by the request server, in response to the automatically determining indicating there are one or more previous generations of requests, the request server from the one or more generations of requests, wherein the immunizing comprises:
        selecting, by the request server, one or more messages associated with one or more requests from the one or more previous generations of requests; and
        processing the one or more messages, the processing including deleting one or more messages or saving one or more messages;
      wherein, concurrent to the immunizing, one or more requests of the new generation of one or more requests are capable of being processed by the request server.

11. The computer system of claim 10, wherein the immunizing comprises starting one or more immunization threads, in response to the checking indicating one or more previous generations of the request server, wherein the one or more immunization threads select the one or more messages associated with the one or more requests from the one or more previous generations of requests and perform the processing of the one or more messages.

12. The computer system of claim 10, wherein the selecting one or more messages associated with one or more requests from the one or more previous generations comprises:
    indicating a previous generation of requests for the request server to be processed;
    determining if there are one or more requests of the indicated previous generation to be processed; and
    obtaining from a communication queue coupled to the request server one or more requests having the indicated previous generation, in response to the determining indicating there are requests to be processed.

13. The computer system of claim 12, wherein each request of the communication queue includes a tag indicating its associated request server and a generation of the request server, and wherein the obtaining uses the tag to identify the one or more requests having the indicated previous generation.

14. The computer system of claim 12, wherein the selecting one or more messages associated with one or more requests further comprises:
    determining if there are one or more responses for the indicated previous generation of the request server; and
    obtaining from the communication queue one or more responses having the indicated previous generation, in response to the determining indicating there are responses to be processed.

15. The computer system of claim 14, wherein processing the one or more messages includes at least one of deleting the one or more requests, deleting the one or more responses, or saving the one or more responses.

16. The computer system of claim 14, wherein the method further comprises deleting a generation message for the request server from the communication queue, in response to processing the one or more messages for a previous generation corresponding to the generation message.

17. A computer-implemented method of managing orphaned requests in a multi-server processing environment, said method comprising:
    automatically determining, by a request server executing on a processor of the multi-server processing environment, in response to recovery of the request server in which the request server is to process a new generation of one or more requests, whether there are one or more previous generations of requests of the request server that are outstanding, wherein the automatically determining is independent of use of the a log and includes checking a communication queue coupled to the request server for one or more generation messages indicating one or more previous generations of the request server, wherein a generation message of the one or more generation messages comprises a key indicating it is a generation message, an identification of the request server, and a unique generation value distinguishing the generation of that generation message from the one or more previous generations; and immunizing by the request server, in response to the automatically determining indicating there are one or more previous generations of requests, the request server from the one or more generations of requests, wherein the immunizing comprises:
  selecting, by the request server, one or more messages associated with one or more requests from the one or more previous generations of requests; and
  processing the one or more messages, the processing including deleting the one or more messages or saving the one or more messages;
wherein, concurrent to the immunizing, one or more requests of the new generation of one or more requests are capable of being processed by the request server.

18. The computer-implemented method of claim 17, wherein the immunizing comprises starting one or more immunization threads, in response to the checking indicating one or more previous generations of the request server, wherein the one or more immunization threads select the one or more messages associated with the one or more requests from the one or more previous generations of requests and perform processing of the one or more messages.

19. The computer-implemented method of claim 17, wherein the selecting one or more messages associated with one or more requests comprises:
  indicating a previous generation of requests for the request server to be processed;
  determining if there are one or more requests of the indicated previous generation to be processed;
  obtaining from a communication queue coupled to the request server one or more requests having the indicated previous generation, in response to the determining indicating there are requests to be processed;
  determining if there are one or more responses for the indicated previous generation of the request server; and
  obtaining from the communication queue one or more responses having the indicated previous generation, in response to the determining indicating there are responses to be processed.

* * * * *